I. DYER.
VEHICLE SIGNAL DEVICE.
APPLICATION FILED APR. 12, 1921.
1,415,814. Patented May 9, 1922.
2 SHEETS—SHEET 1.
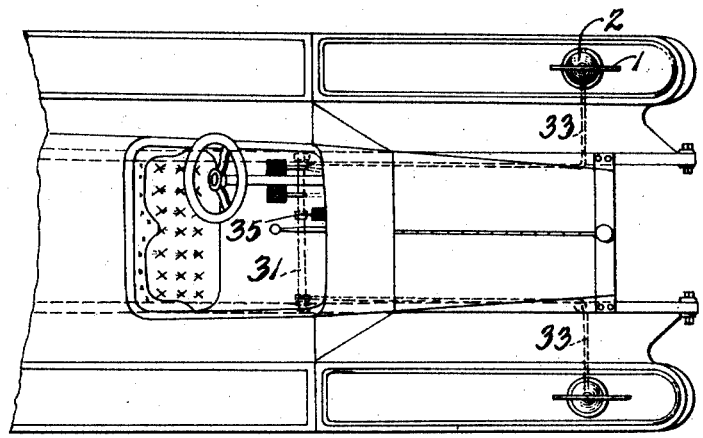
Fig. 1.
Fig. 2.
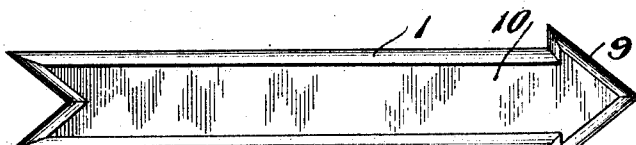
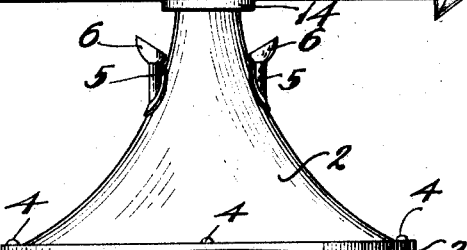
Fig. 10. Fig. 11.
Fig. 12.
Inventor
Ivan Dyer
Witness:
G. H. Wagner
By Robt Roberts Lee
Attorneys

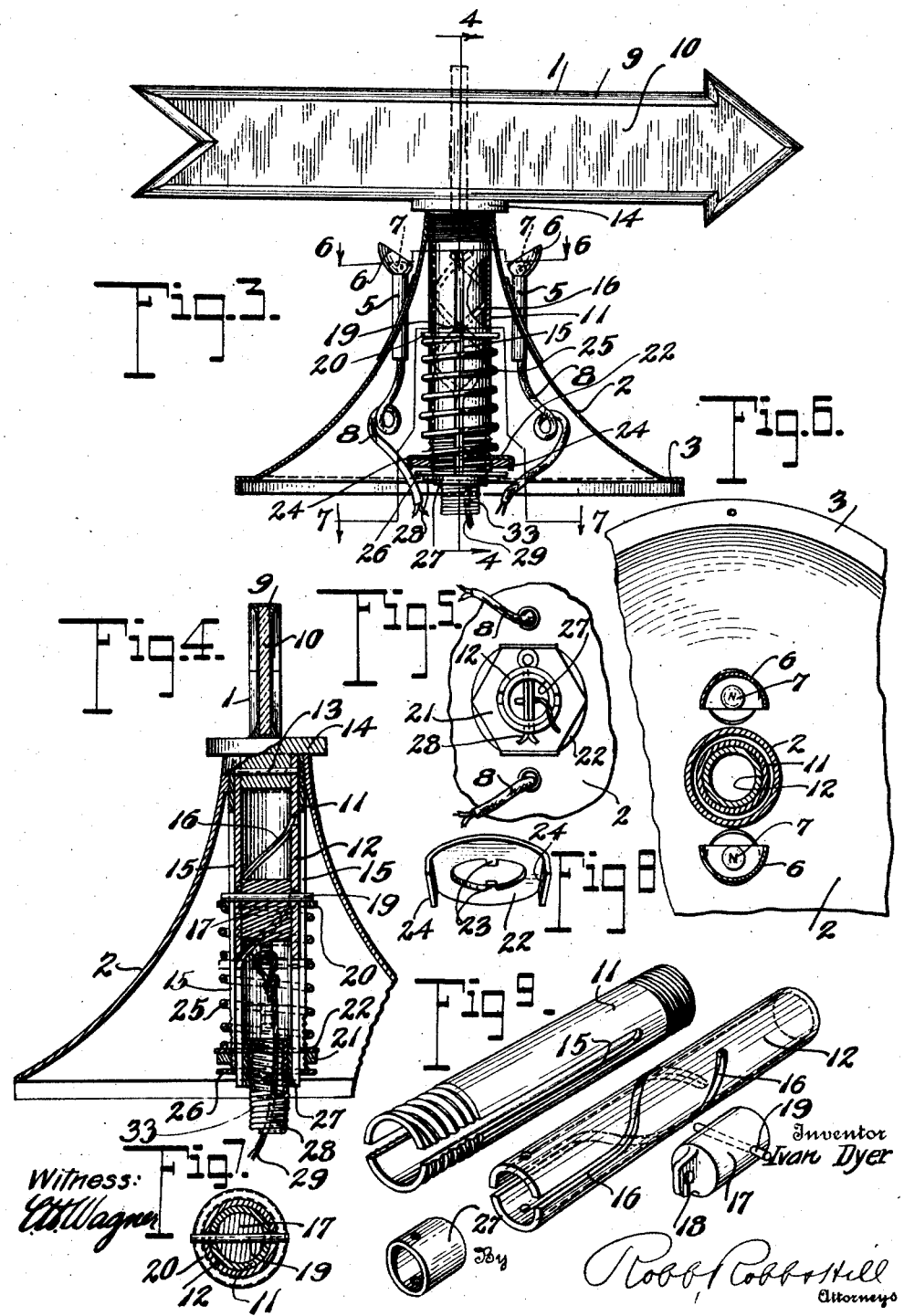

UNITED STATES PATENT OFFICE.

IVAN DYER, OF INDIANAPOLIS, INDIANA.

VEHICLE SIGNAL DEVICE.

1,415,814. Specification of Letters Patent. Patented May 9, 1922.

Application filed April 12, 1921. Serial No. 460,702.

*To all whom it may concern:*

Be it known that I, IVAN DYER, a citizen of the United States, residing at Indianapolis, in the county of Marion and State of Indiana, have invented certain new and useful Improvements in Vehicle Signal Devices, of which the following is a specification.

My invention relates to signals for automobiles and other vehicles and has for its object to provide a device of this character which can be easily installed at a suitable point on the vehicle and operated by the driver of the vehicle to indicate intended direction of travel of the vehicle.

A more particular object of the invention is to provide a signal device for automobiles comprising a rotary signal arm which can be mounted upon a fender or other part of the vehicle and operated through a suitable cable by a foot-pedal projecting above a floor board in front of the driver's seat.

Another object of the invention is to provide a signal comprising a rotatable signal arm adapted to be mounted on a fender or other part of an automobile together with suitable lighting means for lighting the signal at night.

A further object of the invention is to provide a signal comprising a rotatable direction indicating arm adapted to be mounted upon a vehicle at a suitable point and improved means for operating said arm.

With these and other objects in view, which will more fully appear as the description proceeds, the invention consists in certain combinations and arrangements of parts the novel features thereof being pointed out in the appended claims.

For a full understanding of the invention, reference is to be had to the following description and accompanying drawings in which:

Figure 1 is a top plan view of a portion of an automobile showing my invention applied thereto.

Figure 2 is a side elevation showing the manner in which a signal is mounted upon the fender of the automobile.

Figure 3 is a side elevation similar to Figure 2 but partly in section to show certain details of construction.

Figure 4 is a sectional view taken on the line 4—4 of Figure 3 looking in the direction of the arrows.

Figure 5 is a fragmentary view of Figure 3 looking from the bottom.

Figure 6 is a section on the line 6—6 of Figure 3 looking in the direction of the arrows.

Figure 7 is a sectional view on line 7—7 of Figure 3 looking in the direction of the arrows.

Figure 8 is a perspective view of a lock washer employed in my construction.

Figure 9 is an exploded view showing certain features of the construction.

Figure 10 is a perspective view of the foot operated means for the signal cables.

Figure 11 is a detail view of the slotted plate through which the stem of the foot pedal extends.

Figure 12 is a detail view showing the interlocking engagement between the shank of the foot pedal and the floor plate through which said shank extends.

Corresponding and like parts are referred to in the following description and indicated in all of the views of the drawings by like reference characters.

Referring to the drawings, there is shown in Figure 1 a plan view of the front portion of an automobile showing my improved signal device mounted upon each of the front fenders, but I desire it to be understood that the device may as readily be mounted upon the rear fenders or at any other suitable points on the vehicle. Each signal device comprises a direction indicating arrow 1 rotatably mounted upon a member 2 which forms a support for the arrow and a housing for a portion of the means for operating it. The member 2 is provided at its lower end with a downturned flange 3 which may be suitably cut away to fit the curvature of the particular fender upon which the device is to be mounted. The supporting member 2 is secured to the fender by means of small bolts 4. Extending through the member 2 and secured thereto in any suitable manner are a pair of incandescent light bulb sockets 5 having at their upper ends reflectors 6 for the small light bulbs 7. These lighting devices are preferably arranged at the front and rear of the support 2 in order to reflect the light broadside upon the arrows when the latter are rotated in either direction. Connected to the light sockets 5 are the conductors 8 which are suitably connected with the storage battery of the automobile. The arrow 1 may be made of any suitable material, but as shown comprises a metal frame 9 of channel cross section (Figure 4) and the glass panel 10. The metal frame is preferably made in two sections and after the glass panel is assembled therewith the sections may be secured together in any appropriate manner as by soldering or by small screws countersunk into the metal. The upper end of the member 2 has a tubular screw-threaded bore engaged by the upper screw-threaded end of an outer sleeve member 11. Telescoping within the outer sleeve member 11 is an inner sleeve member 12 and secured within the upper end of this inner sleeve 12 is a stem 13 of a circular head 14 resting upon the upper end of the supporting member 2 and to which the arrow 1 is secured by small screws countersunk into the head. From the description thus far it will be seen that rotation of the inner sleeve will cause rotation of the arrow. The outer sleeve member 11 is provided with diametrically opposite straight slots 15 and the inner sleeve member 12 with diametrically opposite slots 16, the lower end portions of which are straight and the upper end portions of which are spiral. Reciprocally mounted within the bore of the inner sleeve is a plunger 17 having a downwardly projecting apertured lug 18 and provided with a transverse pin 19, the opposite ends of which extend through the diametrically opposite slots in the inner and outer sleeves. The projecting ends of the pin 19 are engaged on the under side by a washer 20 mounted on the outer sleeve. The lower end of the outer sleeve is screw-threaded and mounted thereon is a nut 21 upon the upper face of which rests a lock washer 22 having diametrically opposite inwardly projecting tongues 23 engaging in the diametrically opposite slots in the outer sleeve to prevent the washer from turning and having opposite end portions 24 adapted to be bent downwardly into engagement with opposite straight sides of the nut 21 to lock the latter in adjusted position. Surrounding the outer sleeve between the washers 20 and 22 is a coil spring 25. The lower end of the inner sleeve 12 projects slightly beyond the lower end of the outer sleeve 11 and mounted thereon is a washer 26. Mounted within the bore of the lower end of the inner sleeve 12 is a short tubular bushing 27 held in position by a cotter pin 28 extending through the bushing and the lower end of the inner tube beneath the washer 26. Obviously the cotter pin prevents the inner sleeve to which the arrow is fastened from being withdrawn from the outer sleeve. To the apertured lug 18 of the plunger 17 is secured one end of an operating cable 29 which extends beneath the body of the automobile and has its other end secured to an arm 30 projecting from a transverse shaft 31 secured by means of brackets to the under side of a floor board in front of the driver's seat. The cable 29 will preferably be surrounded by a flexible metallic protecting tube 33, one end of which may conveniently be arranged within the bushing 27. The cotter pin 28 will of course extend through this tube 33. Of course it will be understood that since a signal device is mounted on each of the front fenders a cable will extend from each device and be attached to an arm of the transverse shaft 31 so that actuation of the latter will simultaneously actuate both signals. Extending through the floor board and pivotally connected to an arm 34 projecting from the shaft 31 is a foot pedal 35. Countersunk in the upper surface of the floor board is a metal plate 36 having a slot through which the stem of the foot pedal extends. The stem of the foot pedal is provided with a pair of notches 37 and 38, one near its upper end and the other near its middle.

Having now described the construction of my device, its operation is as follows:

The normal position of the foot pedal is with the front wall of the slot in the plate 36 engaged in the lower notch 38 in the stem of the foot pedal. In this position of the foot pedal the plungers 17 will be held in a neutral position with the transverse pins midway of the ends of the spiral portions of the diametrically opposite slots in the inner sleeve members 12 and with the coil springs surrounding the outer sleeve members 12 under considerable tension. In this position of the plungers the arrows occupy a non-signalling position pointing straight ahead. If now the foot pedal is depressed so as to engage the front wall of the slot in the plate 36 with the upper notch in the stem of the foot pedal, the plungers 17 will be moved downwardly and the pins 19 moving in the spiral slots of the inner sleeve members 12 will cause the latter to rotate and turn the signal arrows to a signalling position. At the same time the coil springs 25 surrounding the outer sleeves 12 will be put under greater tension. If on the other hand when the front portion of the slot in the plate 36 is in interlocking engagement with the lower notch 38, the foot pedal is moved laterally by the operator's foot to release this interlocking engagement, the plungers 17 will be urged upwardly from their neutral position by the coil springs 25 and the pins 19 moving in the upper portions of the spiral slots in the inner sleeve members 12 will cause the latter to turn with the signal arrows occupying a different signalling position.

I have shown and described one embodiment of means for operating the cables 29. But I reserve the privilege of adopting such modifications as fall fairly within the spirit and scope of the invention as claimed.

From the foregoing description taken in connection with the accompanying drawings, it will be apparent that I have produced an improved signal device which is very simple and compact in construction and which does not detract from the appearance of the vehicle on which it is used. All of the elements thereof except the means for operating the cable 29 are carried by the supporting member 2 and the latter is easily and detachably secured in position upon any fender by the small bolts 4, it only being necessary to drill small holes in the fender for the passage of the bolts and the central aperture for the passage of the tube 33 and the conductors 8. If the arrow becomes damaged it is only necessary to withdraw the cotter pin 28 which will permit the inner sleeve 12 carrying the head 13 upon which the arrow is mounted to be removed from the outer sleeve 11. The arrow can then be repaired or replaced by a new one. Due to the arrangement of the lights in connection with the arrow the latter can be seen at all times, day or night, and forms a convenient means for indicating to the public the intended direction of travel.

Having thus described my invention, what I claim and desire to secure by Letters Patent is:

1. A signal comprising a relatively stationary supporting member, a rotary member journaled in said stationary member and having a spiral slot in the wall thereof, a signal arm carried by said rotary member and means for shifting said signal arm as an incident to actuation of the rotary member comprising a part relatively movable with respect to said rotary member and including a pin extending through the slot thereof, said pin engaging with the relatively stationary member and being guided thereby.

2. A signal comprising a tubular standard having a guide slot therein, a rotary signal carrying member journaled in said tubular member and having a spiral slot through the wall thereof, and actuating means slidably mounted within said rotary member and having a pin projecting through the spiral slot thereof and interengaging with the slot in the stationary member whereby upon movement of said actuating means relative to the rotary member rotary movement is imparted to the signal.

3. A signal comprising a relatively stationary supporting member, a rotary member journaled therein, actuating means slidably engaging the rotary member and relatively movable with respect thereto to impart rotary movements to said rotary member, said actuating means interlocking with the stationary member to prevent rotation of said actuating means during the movements thereof.

4. A signal comprising a relatively stationary supporting member, a rotary member journaled therein, actuating means slidably engaging the rotary member and relatively movable with respect thereto to impart rotary movements to said rotary member, said actuating means interlocking with the stationary member to prevent rotation of said actuating means during the movements thereof, and tension means operatively connected to the actuating means aforesaid and exerting pressure thereon tending to move the signal in one direction, said actuating means being manually movable against the tension means for shifting the signal member in the opposite direction.

5. A signal comprising a supporting member adapted to be mounted upon a vehicle, a rotary member journaled in said supporting member and having a spiral slot therein, a signal arm carried by said rotary member and normally occupying a non-signalling position, a member slidably mounted with respect to said rotary member and having a pin operatively engaging in said slot to cause rotation of said rotary member upon movement of said sliding member to move said signal arm to and from signalling position, and means for actuating said sliding member.

6. A signal comprising a supporting member adapted to be mounted upon a vehicle, a sleeve journaled in said supporting member, a signal arm carried by said sleeve, said sleeve having diametrically opposite spiral slots, a plunger mounted to reciprocate in said sleeve and having a pin projecting through said slots, means for engaging said pin to prevent rotation of said plunger while permitting reciprocation thereof, and means for actuating said plunger in opposite directions whereby to cause rotary movements of said sleeve to move said signal arm to and from signalling position.

7. A signal comprising a supporting member adapted to be mounted upon a vehicle, a rotary member journaled in said supporting member and having a spiral slot therein, a signal arm carried by said rotary member and normally occupying a non-signalling position, a member slidably mounted with respect to said rotary member and having a pin operatively engaging in said slot to rotate said rotary member, said sliding member normally occupying a neutral position such that movement thereof in one direction causes the rotary member to turn the signal to one signalling position whereas movement thereof in the opposite direction causes the rotary member to turn the signal to a different signalling position, and means for holding the sliding member in neutral position and for moving it in opposite directions therefrom.

8. The combination with a vehicle, of a signal device therefor comprising a supporting member mounted thereon, a rotary member journaled in said supporting member, a signal arm carried by said rotary member and normally occupying a non-signalling position, and means for imparting rotary movements to said rotary member to move said signal arm to and from signalling position, comprising a sliding member operatively connected to said rotary member, a manually operable member constituting locking means for positively retaining the signal member in its normal position and means for operatively connecting said sliding member with said manually operable member.

9. The combination with a vehicle, of a signal device therefor comprising a supporting member mounted thereon, a rotary member journaled in said supporting member, a signal arm carried by said rotary member and normally occupying a non-signalling position, and means for imparting rotary movements to said rotary member to move said signal arm to and from signalling positions comprising a sliding member operatively connected to said rotary member and normally occupying a neutral position such that movement of said sliding member in one direction will move the signal arm to one signalling position while movement thereof in the opposite direction will move the signal arm to a different signalling position, means for urging said sliding member in one direction and manually operable means for moving it in the opposite direction and holding it in neutral position.

10. A signal device of the class described comprising a stationary supporting member having opposing slots in the walls thereof, a rotary member journaled in said stationary member and having a spiral slot therethrough, a signal arm carried by said rotary member, actuating means for shifting said rotary member including a part slidably engaging said rotary member and having a pin extending through the slot thereof and into the slot of the stationary member, spring means surrounding the stationary member and engaging the pin aforesaid tending to shift the pin-carrying part in one direction for movement of the signal in one direction and a manually operable part operatively connected to said pin-carrying part for shifting the latter in the opposite direction to shift the signal corresponding, and means for locking the actuating means against actuation by the spring whereby to hold the signal member in nonsignalling position.

In testimony whereof I affix my signature.

IVAN DYER.